SIMULTANEOUS READ-WRITE ADDRESSING

Filed June 13, 1962

3 Sheets-Sheet 1

INVENTORS
FLOYD M. HARTWIG
KEVIN LEENAY
GEORGE B. STRAWBRIDGE
BY Thomas J. Nikolai
AGENT INVENTORS
FLOYD M. HARTWIG
KEVIN LEENAY
GEORGE B. STRAWBRIDGE
BY Thomas J. Nikolai
AGENT Feb. 22, 1966 F. M. HARTWIG ETAL 3,237,169

SIMULTANEOUS READ-WRITE ADDRESSING

Filed June 13, 1962 3 Sheets-Sheet 3

INVENTORS
FLOYD M. HARTWIG
KEVIN LEENAY
GEORGE B. STRAWBRIDGE
BY Thomas J. Nikolai
AGENT United States Patent Office 3,237,169

Patented Feb. 22, 1966

3,237,169

SIMULTANEOUS READ-WRITE ADDRESSING

Floyd M. Hartwig, Kevin Leenay, and George B. Strawbridge, St. Paul, Minn., assignors to Sperry Rand Corporation, New York, N.Y., a corporation of Delaware Filed June 13, 1962, Ser. No. 202,173
4 Claims. (Cl. 340—172.5)

Figure 1A:
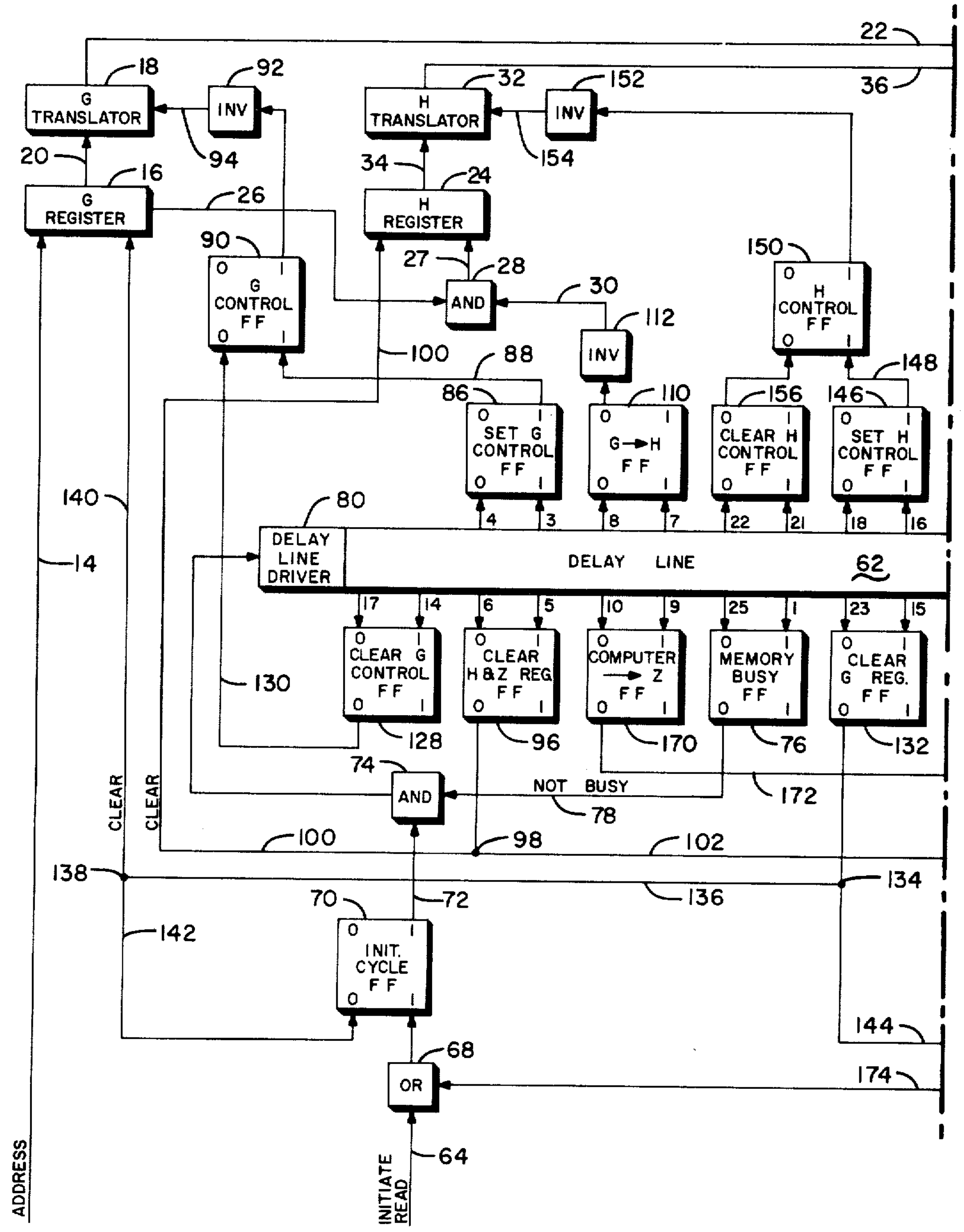

This invention relates generally to a memory system for use in digital processing equipment, and more specifically to a method and apparatus for reducing the normal cycle time of coincident current type destructive readout memory.

As is well known in the art, storage of digital information may be accomplished by utilizing the properties of magnetic cores. Each core in a memory system may be a small piece of material possessing a substantial rectangular hysteresis loop. Because of the rectangular characteristic, each core acts as an electrical bistable device whose state represents the storage of either a "1" or a "0" depending on the direction of the remanent magnetization.

In a typical coincident current memory system these cores are arranged to form an assembly of N planes of dimension XY, where N is the number of bits in the words stored, and X and Y are the dimension of each plane expressed in lines of cores. Therefore, in a particular plane, each X line has Y cores and each Y line has X cores. In any one plane, a given pair of X and Y lines intersects at only one core, and an N bit word stored in the matrix has one bit in each of the N planes, at the same X–Y location in each plane.

In the prior art systems, the memory address of any stored word, received by way of address input lines, specifies that reading or writing is to occur in the particular X–Y location in the matrix assembly. To specify the location, the binary-encoded address is translated by suitable circuitry in two parts; one for selecting the X location, and one for selecting the Y location. The X and Y selection lines from the translator operate suitable selection switches, which are connected to the X and Y lines passing through all N matrix planes. Pulses on these lines from the X and Y line driver circuits cause reading or writing operation to be performed simultaneously on N cores in the selected X–Y locations.

The selection of either reading or writing is commonly controlled by suitable memory control circuits. During a reading operation "1" and "0" bits are read over N sense lines to a suitable register, termed a memory buffer register, for at least temporarily holding the information read out from the memory. During a writing operation, the presence of a particular word in this buffer register determines whether or not "inhibit" signals will be generated on N lines each of which governs the storage of either a "1" or a "0" in each core. It is this register which is also used for storing information read out of the matrix assembly until the information has been restored back into the memory location from which it was originally obtained. This feature is necessary because of the destructive readout technique employed in the system.

Reading or writing is most generally accomplished by a seqeunce of current pulses passing through the various wires in the core matrix. Writing of information is accomplished in three steps termed the "clear," "write," and "disturbed" steps. The "clear" step is executed by the application of two pulses coincidently applied to the X and Y drive lines. The amplitude of these pulses is such that their combined effect is to force the core located at the intersection to the "0" state. Because of the rectangular hysteresis characteristics, only one of the pulses on a core will have no altering effect thereon, since it is not of sufficient magnitude to change the state of the core.

The "write" step is similarly executed by the application of two coincident current pulses on the X and Y drive lines. However, these pulses are of opposite polarity to the pulses used in the "clear" step. If a "0" is to be written, the effect of the two coincident pulses is partially cancelled by the application of a controlled inhibit pulse. The inhibit pulse is of opposite polarity but is equal in magnitude to one of the writing pulses. If a "1" is to be written, the inhibit pulse is not applied, and the resulting magnetizing force switches the core to the "1" state. As was mentioned above, the application of the inhibit pulse to the various lines in the memory is controlled by the information contained in the appropriate stages of the memory buffer register.

Reading of information is also generally performed in three steps which may be termed the "read," the "restore," and the "disturb" steps. The "read" step is essentially the same as the "clear" step of writing, except that when the cores storing "1" bits are switched, the resulting change in flux is detected on the sense lines threading each plane. Cores already in the "0" state are switched so that only a negligible noise signal is induced on the sense windings. The "1" signal so read are amplified and inserted into the proper stage of the buffer register. As well as being retained in the buffer register, the information is also sent to its appropriate destination as determined by the computer program. The reason for retaining the information in the buffer register is that the read step destroys the information contained in the selected memory location. During the "restore" step the information now in the buffer register can be rewritten back into the memory register from which it was originally obtained.

From the foregoing brief summary of the operation of prior art memory system, it can be seen that the cycle time for the memory starts when an address is initially applied to the translating circuits and terminates upon the completion of the restore step. The method and apparatus of the present invention is designed to decrease this cycle time. According to the method of this invention, the desired result is accomplished by overlapping the "restore" step with the time required for obtaining a new address so that at the completion of the "restore" step the new address is immediately available at the translator for the acquisition of a new word of data from a different memory register.

In order to accomplish this result a second storage address register is provided. Immediately subsequent to the initiation of the "read" step the address representing signals contained in the first address register are transferred to this second address register. When the time in the cycle arrives for the generation of the restore pulses, the address now contained in the second register determines where the information temporarily being held in the memory buffer register is to be rewritten. Immediately after the address representing signals have been transferred to the second address register the first address register is cleared and made ready to accept a new set of address representing signals. By the time that the "restore" step has been completed, the new address representing signals are in the first address register and, hence, there is no need to provide a period in the basic memory cycle for the acquisition and translation of this new address.

It is accordingly an object of the present invention to provide a new and improved method for operating a destructive readout memory.

It is another object of this invention to provide a method for decreasing the normal cycle time of a computer memory.

Still another object of this invention is to provide a novel arrangement of conventional computer type circuitry whereby the speed of operation of the computer can be substantially increased.

Figure 1B:
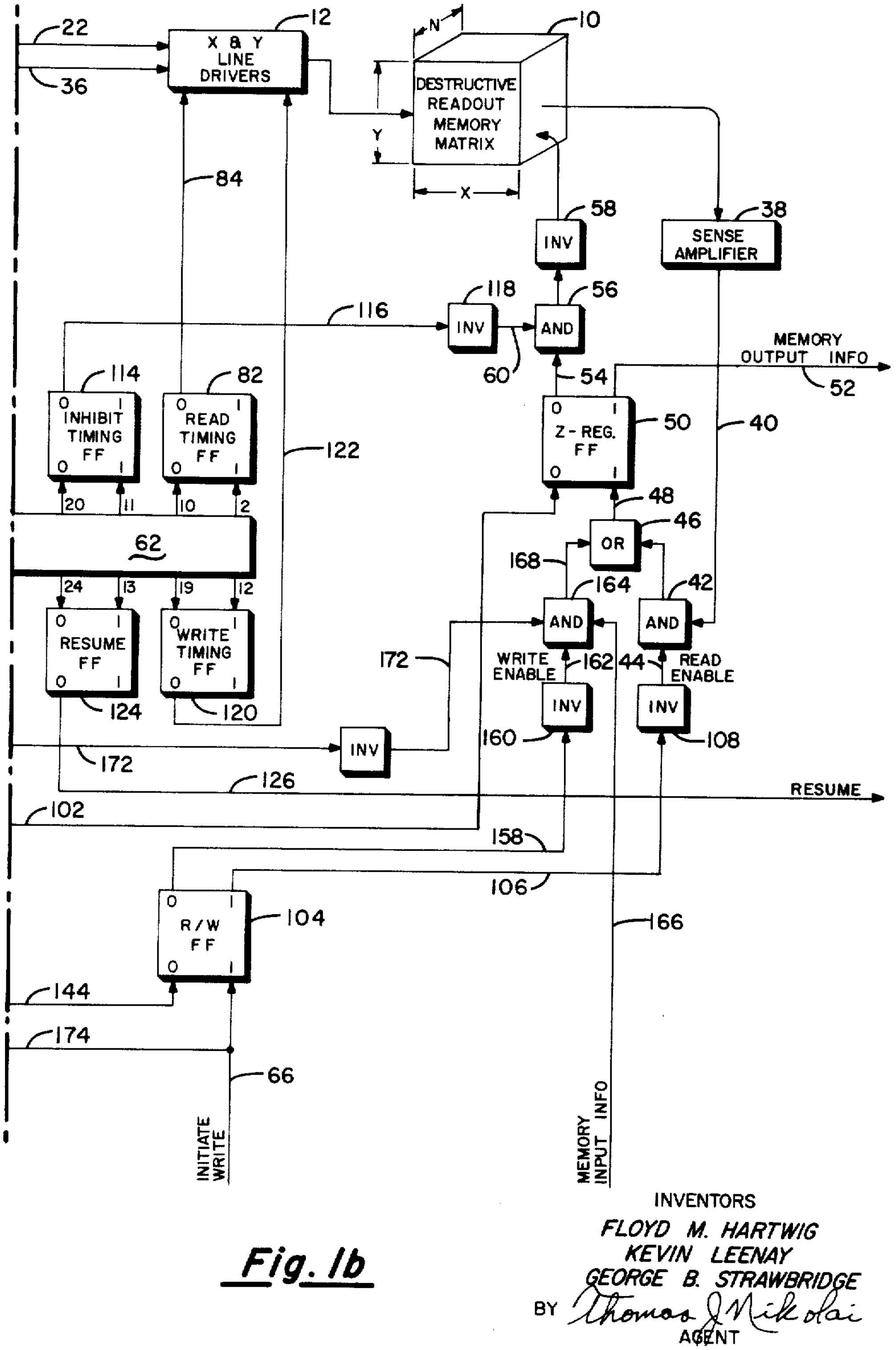

These and other objects and many of the attendant advantages of this invention will be readily appreciated as the same becomes better understood by referring to the following detailed description when considered in connection with the accompanying drawings wherein:

FIG. 1*a* and FIG. 1*b* illustrates in block diagram form preferred memory apparatus for carrying out the method of this invention.

Figure 2:
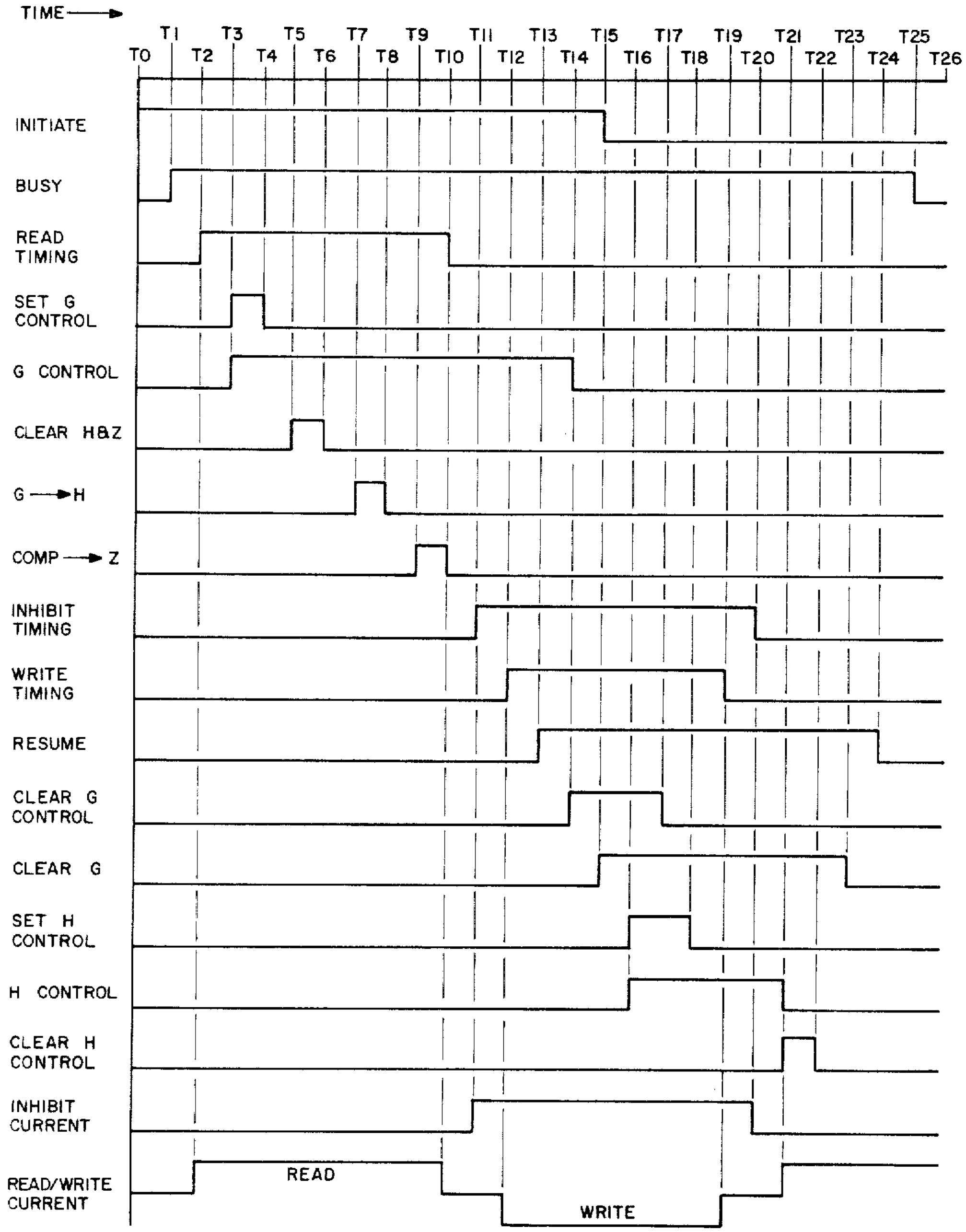

FIG. 2 illustrates a timing diagram for the system of FIG. 1.

Referring now to FIG. 1, there is shown a destructive readout memory matrix 10 along with the various selection driving, and sensing circuits required for operating the memory. The matrix 10 may be comprised of a plurality (N) of memory planes each having X rows and Y columns of bistable magnetic cores. The cores employed in the preferred embodiment, are either toroidal configurations of a magnetic ferrite or thin ferromagnetic films, both being of the type commonly found in computing and switching systems. While toroidal cores or thin ferromagnetic films are preferred for the memory elements because of their small size and relatively low cost, it is not intended that a limitation be inferred, since the only necessary requirement for the elements employed is that they exhibit two stable states.

Associated with the memory matrix are suitable drive and sensing circuits. The block 12 labeled "X and Y Line Drivers" represents circuits for applying current pulses of the proper amplitude and waveforms necessary to produce appropriate signals on the sense windings in the N planes. The curent pulses from the driver circuits are applied simultaneously to one X line and one Y line threading through the memory matrix to select a particular X–Y location.

In one conventional method of operation, the restoration of the read out information or the writing of new information into the memory array is achieved by pulsing the selected X and Y line pairs of each of the N matrix planes individually, either sequentially or simultaneously to store 0's or 1's. This method is generally more expensive in terms of hardware than the method to be subsequently described, since it is required that either the X or Y Current Generators (Drivers) be completely separate on each of the N matrix planes. However, since the method of this invention can be successfully employed with the method of selection outlined briefly above, it is felt that this brief description is appropriate.

The second and preferred selection technique employs only two sets of location drivers. The one set for the X lines and the one set for the Y lines are connected in series through the matrix plane and all of the bits of a word are pulsed simultaneously. It becomes apparent therefore, that the second method of operation is more efficient, since only two sets of location drivers are required.

As is well known in the art, the particular drivers in the two sets which are rendered operative, is dependent upon the address representing signals applied by the computer to the memory storage address registers. As is illustrated in FIG. 1, the address representing signals coming from the computer enter the memory section by way of the cable 14 and are applied to a first storage address register 16, termed the G-Register. The number of bits in the address and therefore the capacity of the register 16 is dependent upon the storage capacity of the memory matrix. For example, with twelve bit positions set aside for representing addresses, it is possible to select only one of 4,096 discrete memory registers. In order to decode the address the G-Translator 18 is included, and receives its input signals from the Storage Address Register 16 by way of the cable 20. The output from Translator 18 which commonly consists of a pulse type signal appearing on the selected one of its plurality of output lines, is applied by way of cable 22 to the X and Y Line Drivers 12. As such, a particular pair of current drivers are activated, the particular pair being determined by the translation of the address representing signal.

Also illustrated in FIG. 1, is a second Storage Address Register 24, termed the H-Register. Cable 26 and 27 connect the individual stages of the G-Register 16 through gating means 28 to the input terminals of the H-Register 24. At the appropriate time in the memory cycle an enabling pulse is applied to the conductors in cable 30 to render the gating means 28 conductive, so as to permit the transfer of the signals from the G-Register 16 to the H-Register 24. A second translator 32 is connected by means of a cable 34 to the output of the H-Register. Translator 32 is substantially identical to translator 18 and operates upon the address representing signals contained in the H-Register to produce selection signals, which are applied by way of the cable 36 to the X and Y Line Drivers 12.

The information read out from the selected memory register is amplified and shaped by a suitable set of Sense Amplifiers 38 and passed by way of cable 40 to an AND circuit 42. A control signal on the line 44 permits the passage of the information signal through the gate 42. The manner in which this control signal is developed, will be described more fully hereinbelow. After passing through the gate 42 the information signals are passed through OR circuit 46 and along the cable 48 to the input terminal of a Memory Buffer Register or Z-Register 50. Assuming that there are 24 bits per word, the Z-Register 50 is also 24 bits in capacity. While in FIG. 1, the Buffer Register is illustrated as a single flip-flop, it should be understood that there are a number of such bistable circuits connected in the well known manner for temporarily storing a plurality of bits. Once the information is placed in the Buffer Register it becomes available by way of cable 52 to other operational registers within the data processing system. The complement of the information contained in the Buffer Register 50 also appears on cable 54 and is applied by way of the AND gate 56 and Inverters 58 to the inhibit windings in the memory matrix 10. The ability of the gate 56 to pass these signals is determined by a control signal on the line 60. The manner in which this control signal is developed and the time in the cycle when it occurs, will be described later on when the details of the timing and control circuit employed in the system are explained.

Thus far, there has been shown the route and the manner in which a particular memory register may be selected, the manner in which the information contained in this register is read out to the Memory Buffer Register, and how the word of information is restored back into the memory register from which it was originally obtained.

The basic element of the control circuits employed to effect transfers at the desired time, is a Delay Line 62. As is well known in the art, when a pulse is applied to such a device it progresses down the line at a predetermined rate, and as it progresses it may be used to operate other circuits connected thereto. Such devices are sometimes also referred to as timing chains and may take any one of several forms. As an aid to the understanding of the operation of the timing and control circuits, reference is made to the timing diagram of FIG. 2.

As is indicated by this timing diagram the cycle is started by the application of an Initiate pulse to one or the other of the control lines 64 or 66. This Initiate pulse comes from the main control section of the data processing system. Since the present specification is concerned with the operation of the memory section of the computer, it is felt to be unnecessary to go into the details of how this pulse is generated.

Assuming that the computer is calling for a read operation, the Initiate Read pulse appears on the conductor 64 and passes through an OR circuit 68 to set the Initiate Cycle flip-flop 70 to its "1" state. The resulting output signal from flip-flop 70 appears on conductor 72 and is applied to a first input terminal of AND circuit 74. Because the Memory Busy flip-flop 76 (associated with the delay line 62) is cleared at this time, a Not Busy signal appears on its output conductor 78 which enables gate 74 so that the signal on line 72 passes therethrough and activates the Delay Line Driver 80. The Delay Line Driver is a circuit which produces a current pulse which lasts as long as the gate 74 remains enabled. This current pulse is applied to Delay Line 62 and passes therealong at a predetermined rate. In FIGURE 1, the small numbers located next to the conductors emanating from the delay line indicate the order in which the conductors are energized as the timing pulse propagates down the line.

Accordingly, as the timing pulse propagates down the delay line, the first circuit to be energized by it is the Memory Busy flip-flop 76. The effect of the pulse is to set this flip-flop to its "1" state and to thereby remove the Not Busy signal from the conductor 78 disabling gate 74. It can be seen that the Memory Busy flip-flop determines the width of the timing pulse and also prevents more than one timing pulse from being applied to the delay line during any one cycle.

The next circuit to be activated by the pulse propagating along the delay line is the Read Timing flip-flop 82. By setting this circuit to its "1" state, a signal is applied over the conductor 84 to the X and Y Line Drivers 12. Next, the Set G-Control flip-flop 86 is switched to its "1" state by the delay line timing pulse, and a signal appears on conductor 88 which, in turn, is used to set the G-Control flip-flop 90. The output signal from the "1" side of this flip-flop is inverted by the invertor circuit 92 and applied to the gating terminal 94 of the G-Translator 18. By providing this gating function on the translator, the address representing signal initially placed in the G-Register 16 upon the application of the Initiate pulse to the conductor 64, are given sufficient time to stabilize before the translation occurs, thereby reducing the possibility of errors in translation. Upon receipt of the gating signal by the G-Translator, the address representing signal appearing on the line in cable 20 are translated and the so selected line in the cable 22 is energized to operate the selected Read Switches in the X and Y Line Driver circuits 12. The Read current from the X and Y Line Drivers therefore passes through the selected read switch and energizes the storage elements in the matrix 10 determined by the address representing signals. While logically it would not be necessary to set the Read Timing flip-flop 82 prior to the activation of the translator 18, it has proved expedient to do so because of the fact that there is an inherent circuit delay in the read current generators. Hence, the Read pulse is generated prior to the time that the G-Translator is activated so that by the time that the G-translator is activated, the Read current is up to its full amplitude.

As the timing pulse continues to travel down the delay line 62, the next circuit to be activated is the Clear H and Z-Register flip-flop 96. The timing pulse sets this flip-flop to its "1" state thereby causing a signal to appear at the junction 98. This Clear pulse passes first along cable 100 to clear out the contents of the H-Register 24, which were placed therein on a preceding cycle. The Clear signals also pass by way of cable 102 to clear out the contents of the Memory Buffer Register or Z-Register 50.

Because during a read operation the Read/Write flip-flop 104 remains in its cleared condition, a signal appears on the output conductor 106 connected to the "1" side thereof, which is inverted by means of an inverter 108 and is applied by way of the cable 44 to the AND circuit 42. Gate 42 is therefore enabled and the information signals read out from the memory are allowed to pass through OR circuit 46 and along cable 48 to set the selected stages of the Z-Register 50 in accordance with the data read out from the memory.

The pulse travels down the timing chain and next triggers the flip-flop 110 to its "1" state. As a result, the signal which appears at the "0" side thereof at this time is inverted by circuit 112 and passes along the conductor 30 to enable the AND circuit 28. This permits the transfer of the address representing signal from the G-Register 16 to the previously cleared H-Register 24. Immediately thereafter, the timing pulse again resets flip-flop 110 to its "0" state, again disabling AND circuit 28.

With the address representing signals now in the H-Register the restoration of the data read out from the selected memory register may now take place. The timing pulse travels down the delay line first clearing the Read Timing flip-flop 82 to thereby disable the Read Current Generators. Subsequently, the Inhibit Timing flip-flop 114 is set. The resulting signal appearing on conductor 116, after being complemented by inverter 118, appears in cable 60 and serves to enable the AND circuit 56. This permits the information contained in the Buffer Register 50 to pass through gate 56 and to be inverted by inverter 58. The signals appearing at the output of inverter 58 go to the Inhibit Drivers (not shown) contained in the memory module. As mentioned in the introductory portion of the specification, the effect of an Inhibit pulse is to cancel out the Write pulse for the particular bits in the selected word where a "0" is to be written. The Write pulse itself is generated at the time in the cycle when the Write Timing flip-flop 120 is set. The resulting signal appearing at the "0" output thereof, is applied by way of conductor 122 to the X and Y Line Drivers 12. It can be seen that at this time both the Inhibit Drivers and the X and Y Line Write Drivers are active. However, the contents of a particular memory register can not yet be altered because, as yet, the Write Selection Switch, selected by the output of the Translator 32, has not been turned on. Before the writing operation actually is accomplished, the pulse traveling down the timing chain sets the Resume flip-flop 124 to its "1" state to thereby develop a signal on conductor 126 which leads back to the main control section of the computer. This Resume signal informs the computer that the memory section is ready to receive another set of address representing signals. Accordingly, the timing pulse sets the Clear G Control flip-flop 90. As before, when the flip-flop 90 is cleared, a gating pulse is applied to the terminals 94 of the G-Translator 18, and the address representing signals contained in the G-Register 16 are loaded into the translator. The timing pulse next sets the Clear G-flip-flop 132 and the resulting output signal from the "0" side thereof appears at junction 134. The signals appearing at junction 134 pass by way of cable 136 to the junction 138. From junction 138 the signals pass along cable 140 and are effective to clear out the contents of the G-Register. The signals appearing at junction 138 also pass on conductor 142 to reset the Initiate Cycle flip-flop 70 to its "0" state. Similarly, the signal appearing at junction 134 pass by way of conductor 144 to clear the Read/Write flip-flop 104.

The timing pulse next places the Set H-Control flip-flop 146 in its "1" state. The resulting output signal from this flip-flop 146 appears on conductor 148 and is effective to set the H-Control flip-flop 150 to its "1" state. The output signal from the H-Control flip-flop is inverted by inverter 152 and is applied to the gate terminal 154 of the H-Translator 32. It is at this time that the particular Write Selection Switch, determined by the address representing signals now in the H-Register, is turned on so that the Write pulse passes through the selected X and Y drive lines. Since both the Write Drivers and the Inhibit Drivers are active, the information which is contained in the Memory Buffer Register is restored into the same memory register from which it was originally obtained.

The timing pulse continues down the delay line and next places the Clear G-Control flip-flop 128 in its "0" state. The Set H-Control flip-flop 146 is then cleared, the net effect being to remove the gating signal from the gating terminal 154 of the H-Translator 32. The restore operation has now been completed and the Write Timing flip-flop 120 can now be cleared. This too, is accomplished by the pulse which propagates down the delay line. Similarly, the timing pulse is applied to the "0" side of the Inhibit Timing flip-flop 114 to reset it to its "0" state. The H-Control flip-flop 150 is next returned to its "0" state when the Clear H-Control flip-flop 156 is set to its "1" state by the delay line timing pulse. Immediately thereafter, the flip-flop 156 is again cleared.

This completes the description of the control circuit operation for reading out a word of information from a specified memory register and for subsequently restoring the information back into the register. The next mode of operation to be considered is that when it is desired to write a word of data into the memory. The operation of the timing and control circuits in the write mode is substantially similar to that previously described for the read mode. However, since there are some differences, it is felt to be appropriate to discuss this mode.

The write mode is started by the application of address representing signal to the cable 14 and the simultaneous application of a Write Initiate pulse to the control line 66. Since the G-Register 16 was cleared on a previous cycle, the new address is loaded therein. The Initiate pulse on conductor 66 sets the Read/Write flip-flop 104 to its "1" state, which causes a signal to develop on the line 158. This signal is complemented by inverter 160 and the resulting signal on conductor 162 serves to partially enable the AND gate 164. Another input to this last mentioned AND gate comes by way of the cable 166 from either the input-output section of the computer or some other operational register in the arithmetic section. The signals on cable 166 represent the data which it is desired to store in the particular memory register determined by the address representing signal now in the G-Register 16. Gate 164 is not fully enabled at this time and, hence, the data does not pass along cable 168 and through OR circuit 46 to the Memory Buffer Register 50. It is not until later in the cycle, when the Computer to Z flip-flop 170 is set by the timing pulse, that an enabling signal is developed at the third input 172 of AND circuit 164.

In addition to setting the Read/Write flip-flop, the Initiate Write pulse on conductor 66 also passes by way of conductor 174 and through OR circuit 68 to set the Initiate Cycle flip-flop 70. As in the case of a read operation, as as the Memory Busy flip-flop is not set, gate 74 will be enabled and the output from the Initiate Cycle flip-flop will pass therethrough to energize the Delay Line Driver 80. In the same manner as previously described, the resulting output from the Delay Line Driver pass down the delay line at a predetermined rate to develop control signals in a predetermined sequence. This timing pulse first sets the Read Timing flip-flop 82 to its "1" state to thereby turn on the X and Y Line Current Drivers. Next, the Set G-Control flip-flop 86 is set producing a signal on conductor 88 which sets the G-Control flip-flop 90 to its "1" state. The resulting output signal from this last mentioned flip-flop is inverted and applied to the gate terminal of the G-Translator 18. It is at this time that the translation occurs to turn on a specific read switch determined by the address code being translated. The Read current therefore passes through the X and Y line for the selected memory register causing the data signals contained therein to be read out and amplified by the Sense Amplifiers 38. Because during a write operation the Read/Write flip-flop is set, no read enable signal is developed on the cable 44 leading to the AND gates 42. Therefore, the information which has been read out from the memory cannot pass through this gate and cannot be loaded into the Buffer Register 50. The effect of this Read pulse, then, is to clear out the contents of the selected memory register, placing all the storage elements therein in a predetermined state.

As the timing pulse continues to propagate, the Set C-Control flip-flop is again cleared, thereby removing the gating pulse from the translator 18. Next, the Clear H and Z flip-flop 96 is set. This produces the requisite control signals on the cable 100 to clear the H-Register and on the cable 102 to clear out whatever information was previously contained in the Buffer Control Register 50. The clear H and Z flip-flop is then immediately restored to its "0" state by the action of the timing pulse. Next, the Transfer G to H flip-flop 110 is set producing an enabling signal on conductor 30 for activating the gate 28. This permits the passage of the address representing signal from the G-Register 16 along cable 26 to the H-Register 24. The timing pulse then immediately clears flip-flop 110.

Because the Z register is now empty, the data which is to be written in the memory, can now be transferred thereto. The timing pulse therefore sets the Computer to Z flip-flop 170 to its "1" state producing the requisite signal on cable 172 to fully enable AND gates 164. The data signal therefore are able to pass along cables 166, 168, and 48 and are placed in the Buffer Register 50. Flip-flop 170 is again cleared when this operation is completed.

As mentioned earlier, writing of information into the memory register is under control of the Inhibit Current Generators. It may be recalled that when writing a "0" into a particular X–Y location, the Write pulse is cancelled by the Inhibit pulse, whereas if a "1" is to be written, the Inhibit pulse is not applied so that the write current is able to switch the memory elements. The timing pulse propagating down the delay line therefore sets the Inhibit Timing flip-flop 114 producing an enabling signal on the cable 60 to permit the transfer of the data signals from the Z-Register to the inputs of the Inhibit Drivers (not shown). The Write pulse itself is not generated until the Write Timing flip-flop 120 is set. When the timing pulse sets this flip-flop a signal is developed on conductor 122 which leads to the X and Y Line Drivers 12. Since, as yet, a write selection switch has not been turned on, no Write current flows into the selected memory register.

As the timing pulse continues to propagate down the delay line, the Resume flip-flop 124 is set developing a control signal which is returned to the main control section of the computer and advises the computer that the memory can again be addressed. The next event to occur is the setting of the Clear G-Control flip-flop 128. This step causes a control signal to pass by way of conductor 130 to clear the G-Control flip-flop 90. Once cleared, the gating pulse is removed from the gate terminal 94 of the G-Translator 18. Next, the timing pulse sets the Clear G-flip-flop 132. The effect of this is to produce signals for clearing the Read/Write flip-flop 104, the Initiate Cycle flip-flop 70 and the G-Register 16. At this time, even though the writing operation has not been completed, the memory section is free to accept a new set of address representing signals.

In order to complete the write cycle of operation the delay line timing pulse places the Set H-Control flip-flop 146 to its "1" state. The effect is to also set the H-Control flip-flop 150 to its "1" state. When this last mentioned flip-flop is set the gate signal is applied to terminal 154 of the H-Translator 32 causing the translation of the code in the H-Register to take place. The resulting signal on cable 36 turns on the selected Write Swtich permitting the Write pulse to flow on the selected X and Y drive lines. The timing pulse then resets the Clear G-Control flip-flop 128 and the Set H-Control flip-flop 146 in that order. Both the G-Control and H control flip-flops are thereby cleared.

Because the information in the Z-Register has now been written into the memory, the Write Current Generators may now be turned off. This is accomplished when the timing pulse clears the G-Control flip-flop 120. Similarly, the Inhibit Drivers are turned off under the control of the timing pulse when it clears the Inhibit Timing flip-flop 114.

The timing pulse continues to propagate down the delay line resetting the various circuits to condition them for a subsequent cycle. More specifically, the Clear H-Control flip-flop is first set and immediately cleared. Next, the Clear G flip-flop is cleared and the Memory Busy flip-flop is cleared.

Thus, it can be seen that there is described one arrangement whereby the method of this invention may be carried out. More specifically, the apparatus described above is capable of accepting a new group of address representing signals during the interval that the information selected by a previous set of address representing signals is being restored into the memory. Similarly, the memory system described is able to receive a new set of address representing signals during the interval that a write operation is being executed, so that at the completion of the write operation a new sequence can be immediately initiated.

Obviously, many modifications and variations of the present invention are possible in the light of the above teachings. It is, therefore, to be understood that within the scope of the appended claims, the invention may be practiced other than as specifically described and illustrated.

What is claimed is:

1. In a memory system for use in digital data processing equipment, the combination comprising: means for obtaining a first set of address representing signals; first translating means responsive to said address representing signals for providing first selection signals in a memory array for selecting a register location therein; second translating means operative during the interval that said register location is being selected for translating said first set of address representing signals to provide second selection signals identical in format to the first selection signals; means for operating on the register location selected by said second set of selection signals; and means for obtaining a second set of address representing signals for repeating the cycle of operation on a different selected register during the interval that the register location selected by said second set of selection signals is being operated upon.

2. In a memory system for use in digital data processing equipment, the combination comprising: a destructive readout memory array having a plurality of addressable information storage registers; first and second registers adapted to temporarily hold address representing signals; means for producing control signals at predetermined time intervals; means responsive to a first control signal for transferring address representing signals to said first register; means responsive to a second control signal for reading out the information contained in the memory storage register specified by said address representing signals; means responsive to a third control signal for transferring said address representing signals; from said first register to said second register; means responsive to a fourth control signal for rewriting the information previously readout from the specified storage register back into the same storage register as specified by the address representing signals now in said second register, the arrangement being such that new address representing signals may be transmitted to said first register during the time interval that the information is being rewritten.

3. In a memory system for use in digital data processing equipment, the combination comprising: a destructive readout memory array having a plurality of addressable information storage registers; first and second registers adapted to temporarily hold storage address representing signals; first and second translating means connected intermediate said memory array and said first and second registers, respectively for producing memory register selection signals; means for producing control signals at predetermined time intervals; means responsive to a first control signal for transferring address representing signals to said first register; means including said first translating means responsive to a second control signal for reading out the information contained in the storage register specified by said memory register selection signals; means responsive to a third control signal for transferring said address representing signals from said first register to said second register; means including said second translating means responsive to a fourth control signal for rewriting the information previously readout from the storage register back into the same storage register as specified by the address representing signals now in said second register, the arrangement being such that new address representing signals may be transmitted to said first register during the time interval that the information is being rewritten.

4. In a memory system for use in digital data processing equipment, the combination comprising: a destructive readout memory array having a plurality of addressable information storage registers; first and second registers adapted to temporarily hold address representing signals; first and second translating means connected intermediate said memory array and said first and second registers, respectively; timing means for producing control signals at predetermined time intervals; means responsive to a first control signal for transferring address representing signals to said first register; means including said first translating means responsive to a second control signal for reading out the information contained in the storage register specified by said address representing signals; means responsive to a third control signal occurring at least partly in time coincidence with said second control signal for transferring said address representing signals from said first register to said second register; means including said second translating means responsive to a fourth control signal for rewriting the information previously readout back into the storage register specified by the address representing signals now in said second register; and means responsive to a fifth control signal occurring at least partly in time coincidence with said fourth control signal for transferring new address representing signal to said first register.

References Cited by the Examiner

UNITED STATES PATENTS 3,068,452 12/1962 Sarrafian ---------- 340—174

ROBERT C. BAILEY, *Primary Examiner.*

MALCOLM A. MORRISON, *Examiner.*

W. M. BECKER, *Assistant Examiner.*